United States Patent
Suzuki et al.

(10) Patent No.: US 7,464,876 B2
(45) Date of Patent: Dec. 16, 2008

(54) IMAGE READING DEVICE (75) Inventors: Masashi Suzuki, Nagoya (JP); Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 155 days.

(21) Appl. No.: 11/412,119

(22) Filed: Apr. 27, 2006

(65) Prior Publication Data
US 2007/0001015 A1   Jan. 4, 2007

(30) Foreign Application Priority Data
Apr. 27, 2005   (JP) ............... 2005-130291

(51) Int. Cl.
*G06F 15/00* (2006.01)
*G06K 7/10* (2006.01)

(52) U.S. Cl. .............. 235/455; 358/486; 358/488; 358/496; 358/497; 358/474

(58) Field of Classification Search ........... 235/462, 235/455, 472.02; 358/474, 496, 497, 505, 358/486, 488
See application file for complete search history.

(56) References Cited

U.S. PATENT DOCUMENTS

| 4,899,227 | A | * | 2/1990 | Yamada | 358/452 |
|---|---|---|---|---|---|
| 5,825,512 | A | * | 10/1998 | Okita | 358/496 |
| 6,747,765 | B2 | * | 6/2004 | Kitamura et al. | 358/497 |
| 2002/0015196 | A1 | * | 2/2002 | Kitamura et al. | 358/505 |
| 2005/0078340 | A1 | | 4/2005 | Kato | |

FOREIGN PATENT DOCUMENTS

| JP | 2003-016382 | * | 1/2003 |
|---|---|---|---|
| JP | 2003-016382 A1 | | 1/2003 |
| JP | 2003 331213 | | 11/2003 |
| JP | 2004 511861 | | 4/2004 |
| JP | 2005 79926 | | 3/2005 |

OTHER PUBLICATIONS

Japan Patent Office, Office Action mailed Oct. 2, 2007 for Priority Application No. JP 2005-130291.

* cited by examiner

*Primary Examiner*—Steven S Paik
*Assistant Examiner*—Sonji Johnson
(74) *Attorney, Agent, or Firm*—Baker Botts L.L.P.

(57) ABSTRACT

There is provided an image reading device, which is provided with an illuminating unit that illuminates an object, a reading unit that forms an image of the object based on light from the object, and an illumination prohibition unit that prohibits the illumination unit from illuminating the object if the illumination prohibition unit receives a command for changing to a code reading mode in which a code formed by a pictorial pattern displayed on a screen of a device is read as the object.

8 Claims, 5 Drawing Sheets

IMAGE READING DEVICE

CROSS-REFERENCE TO RELATED APPLICATION

This application claims priority under 35 U.S.C. §119 from Japanese Patent Application No. 2005-130291, filed on Apr. 27, 2005. The entire subject matter of the application is incorporated herein by reference.

BACKGROUND

1. Technical Field

Aspects of the present invention relate to an image reading device capable of receiving light reflected from an object and forming an image of the object in accordance with the received light.

2. Description of Related Art

Image reading devices, such as a scanner, capable of reading an image formed on a print medium are widely used. In general, the scanner is provided with a light source, a glass plate on which a print medium is placed, and an image sensor. In order to obtain an image formed on the print medium, the light source illuminates the print medium from the lower side of the glass plate, and the image sensor (e.g. a line sensor) is moved from one edge of the glass plate (i.e., a predetermined start position) to the opposite edge of the glass plate. An example of such an image scanner is disclosed in Japanese Patent Provisional Publication No. 2005-79926 (hereafter, referred to as JP 2005-79926A). In general, an image scanner is configured to allow a user to make settings for a reading area according to standards concerning sizes of print media (e.g., JIS; Japanese Industrial Standards).

Recently, a ticket booking system configured as follows has been proposed. In this system, code data (e.g., QR code®) representing a certain pattern is provided to a user when the user books a ticket. For example, the code data is sent to the user's mobile phone by e-mail). At settlement time, the user operates the user's mobile phone to display the code data on a LCD screen of the mobile phone. Then, the user operates a dedicated code reading device so as to make the code reading device read the pattern, corresponding to the code data, displayed on the LCD screen of the mobile phone. An example of such a dedicated code reading device capable of reading an image from an object having a transparent cover layer on its surface is disclosed in Japanese Patent Provisional Publication No. 2003-331213 (hereafter, referred to as JP 2003-331213).

Since such a dedicated code reading device is designed only for obtaining codes, it is not cost-effective to introduce a dedicated code reading device to an office particularly in the case where frequency of usage of the dedicated reading device is low.

A person may try to read code data displayed on a screen of his or her mobile phone by a general-purpose scanner. However, such a try will not achieve success because light from a light source of the scanner reflects from a protective layer or a reflective layer, which forms a LCD screen unit of a mobile phone, and such reflection makes it difficult to appropriately read an image displayed on the LCD screen of the mobile phone.

Use of a general-purpose scanner for reading of code data displayed on a LCD screen of a mobile phone also may raise a problem that a scanning of an image sensor is performed wastefully in a wider range than a range corresponding to the screen size of the mobile phone placed on a glass plate of the scanner because the scanner does not support scanning ranges other than standard paper sizes.

In the case of a folding mobile phone, it may be difficult to place the mobile phone on a general-purpose scanner in such a manner than a screen of the mobile phone closely contacts a glass plate of the general-purpose scanner.

It may be possible to place a folding mobile phone so that the screen of the mobile phone closely contacts the glass plate of the general-purpose scanner by locating a body part including dial keys at the outside of the glass plate. The user probably locates the folding mobile phone at the edge opposite to the scan start position on the glass plate so that the screen of the mobile phone closely contacts the glass plate. In this case, the user is required to operate the general purpose scanner to adjust settings of the scanning range so that the scanning range covers the opposite edge portion of the glass plate where the mobile phone is placed.

SUMMARY

Aspects of the present invention are advantageous in that an image reading device capable of reliably reading an image of a pattern code displayed on a flat display panel of a device is provided.

DETAILED DESCRIPTION

General Overview

According to an aspect of the invention, there is provided an image reading device, which is provided with an illuminating unit that illuminates an object, a reading unit that forms an image of the object based on light from the object, and an illumination prohibition unit that prohibits the illumination unit from illuminating the object if the illumination prohibition unit receives a command for changing to a code reading mode in which a code formed by a pictorial pattern displayed on a screen of a device is read as the object.

Since the illumination of the illuminating unit is prohibited if the command for changing to the code reading mode is received, the screen is prevented from reflecting light and it is possible to reliably read the code displayed on the screen. Such an advantage is enhanced if the screen of the device is configured to display an image by lighting the screen without utilizing reflections of outside light.

According to another aspect of the invention, there is provided an image reading device, which is provided with a reading unit that reads an object in a predetermined size based on light from the object, a scanning unit that moves the reading unit to scan the object along a scanning path, a scan prohibition unit configured such that if the scan prohibition unit receives a command for changing to a code reading mode in which a code formed by a pictorial pattern displayed on a screen of a device is read as the object, the scan prohibition unit prohibits the scanning unit from moving the reading unit so as to stop scanning of the object when the reading unit reads information representing termination of the code.

Since the scanning stops when the reading unit reads the information representing the termination of the code, it is possible to prevent the reading unit from wastefully continuing the scanning despite the fact that the reading unit finishes the reading of the code.

Optionally, the image reading device may include an inverse scanning unit configured such that if the reading unit does not finish reading of the code before the reading unit reaches an end position of a scanning range, the inverse scanning unit moves the reading unit in a direction opposite to a direction in which the reading unit is moved by the scanning unit, from the end position of the scanning range.

With this configuration, even if the screen of the device is placed in the vicinity of the end position of the scanning range and light of the screen is turned off before the reading unit finishes reading the code, the reading of the screen can be attained by only requesting the user to turn on the light of the screen and to place the screen of the device at the opposite edge.

Still optionally, the inverse scanning unit may move the reading unit if the inverse scanning unit receives a command requesting for re-reading.

According to another aspect of the invention, there is provided an image reading device, which is provided with a mount surface on which an object is placed, the mount surface being optically transparent, a reading unit that is located under the mount surface to read the object in a predetermined size based on light incident thereon from the object through the mount surface, a scanning unit that moves the reading unit to scan the object along a scanning path, a scan range setting unit configured to set a range of the scanning path to a scanning range inputted externally, and a scan edge determination unit configured such that if the scan edge determination unit receives a command for changing to a code reading mode in which a code formed by a pictorial pattern displayed on a screen of a device is read as the object, the scan edge determination unit inputs a range including an edge of the mount surface to the scan range setting unit as the scanning range.

Since the scanning range is set to a range including the edge of the mount surface when the command for changing to the code reading mode, it is possible to read the code of the screen placed at the edge of the mount surface without requesting a user to conduct an operation for setting the scanning range to the range including the edge of the mount surface.

Optionally, the image reading device may include an inverse scanning unit configured such that if the reading unit does not finish reading of the code before the reading unit reaches an end position of the scanning range, the inverse scanning unit moves the reading unit in a direction opposite to a direction in which the reading unit is moved by the scanning unit, from the end position of the scanning range.

With this configuration, even if the screen of the device is placed in the vicinity of the end position of the scanning range and light of the screen is turned off before the reading unit finishes reading the code, the reading of the screen can be attained by only requesting the user to turn on the light of the screen and to place the screen of the device at the opposite edge.

Still optionally, the inverse scanning unit may move the reading unit if the inverse scanning unit receives a command requesting for re-reading.

With regard to the above mentioned three aspects of the invention, the image reading device may include an input unit configured to input the command for changing to the code reading mode. In an example, the screen of the device may include a LCD screen of a mobile phone.

Illustrative Embodiments

Hereafter, an illustrative embodiment according to the invention will be described with reference to the accompanying drawings.

Figure 1A:
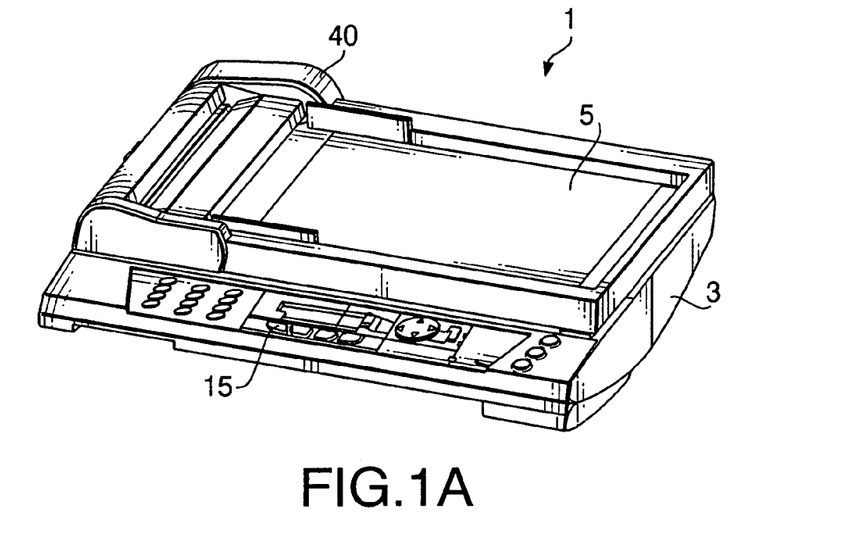
FIGS. 1A and 1B is are perspective views of an image reading device, respectively illustrating outward appearances of the image reading device.
Figure 1B:
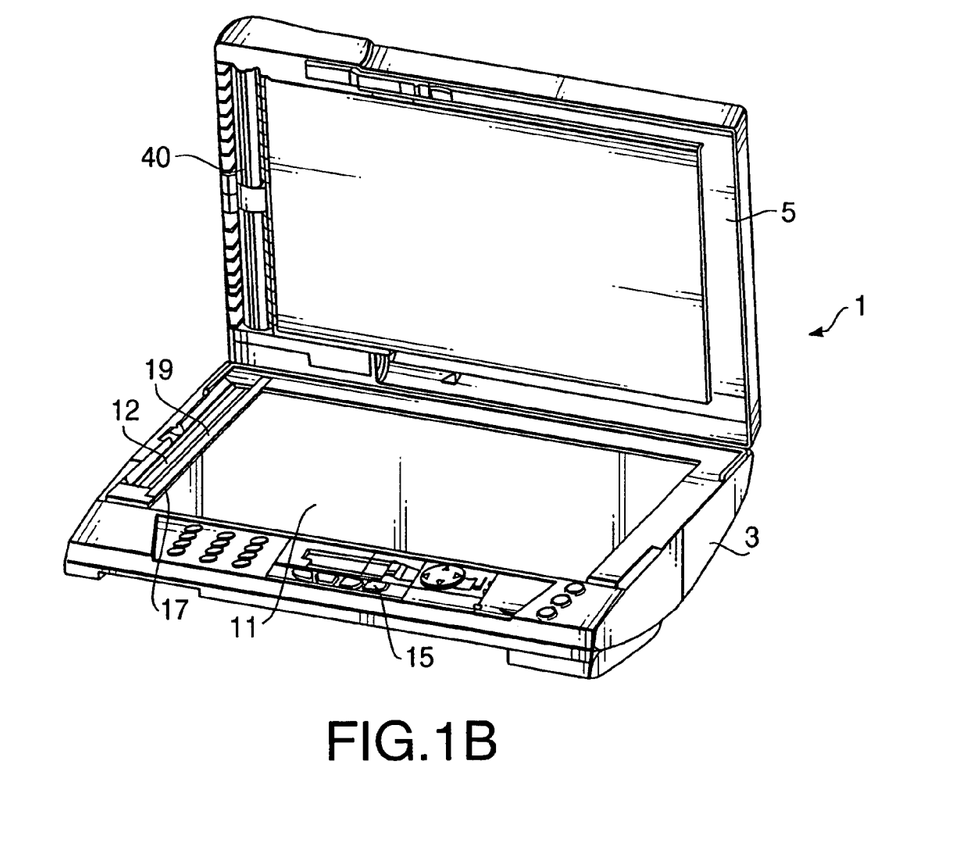
Figure 2:
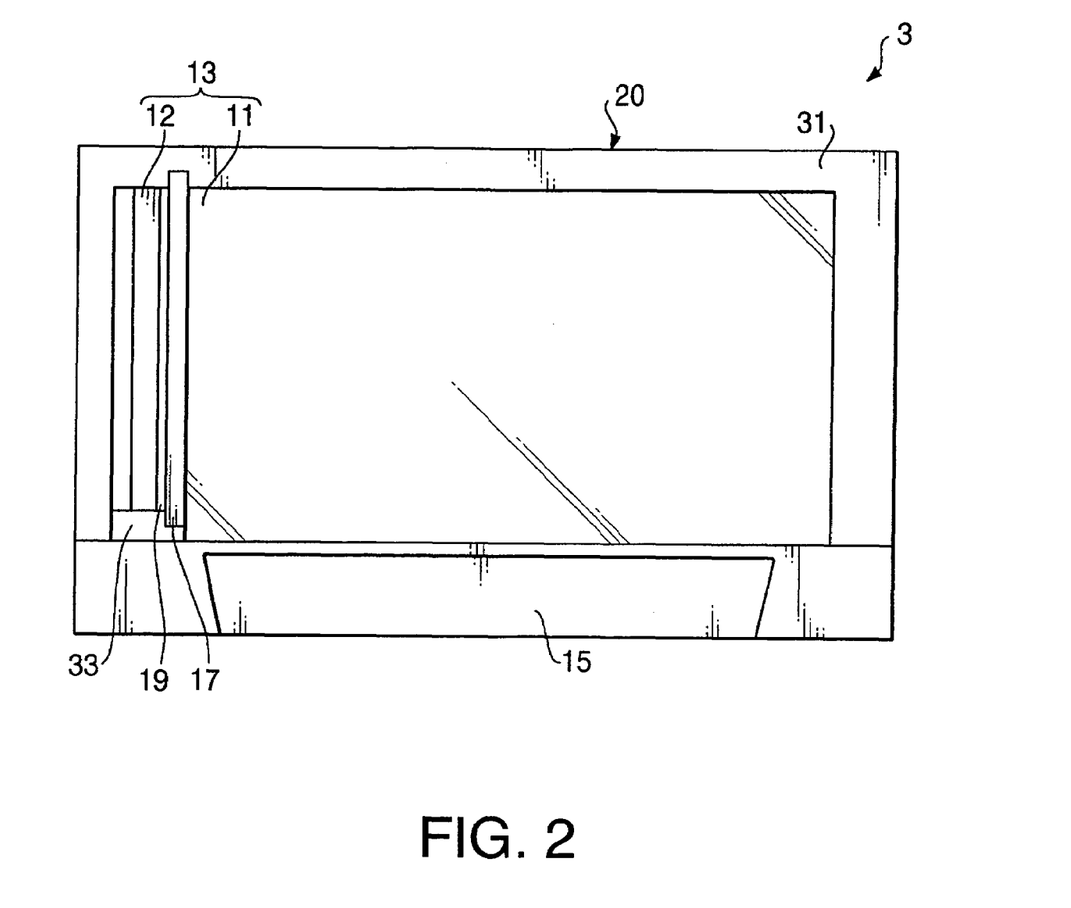
FIG. 2 is a plan view of a main body of the image reading device illustrating the top of the image reading device.
Figure 3A:
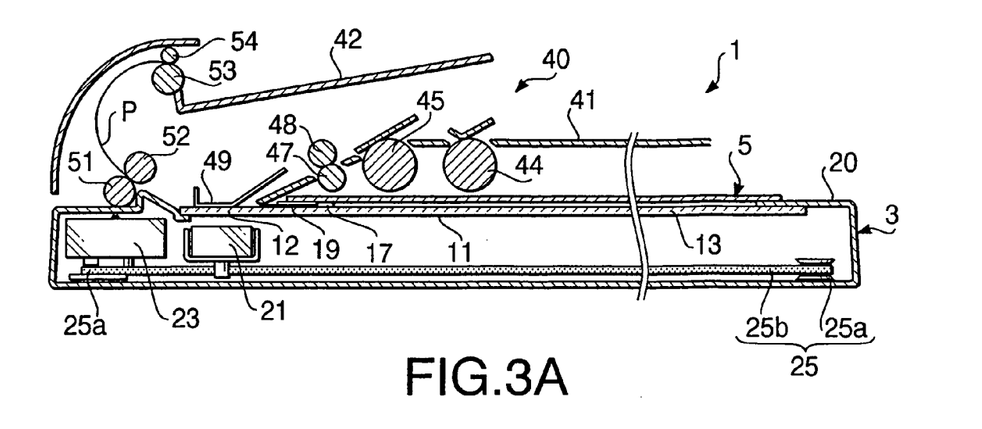
FIGS. 3A and 3B are longitudinal cross sections of the image reading device.
Figure 3B:
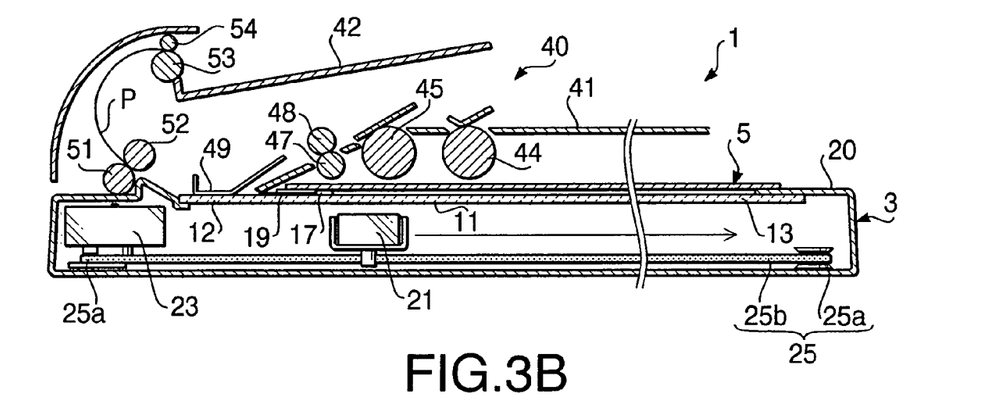

First, a configuration of an image reading device 1 according to the illustrative embodiment will be described with reference to FIGS. 1A, 1B, 2, 3A and 3B. FIGS. 1A and 1B are perspective views of the image reading device 1, respectively illustrating outward appearances of the image reading device 1. FIG. 2 is a plan view of a main body 3 of the image reading device 1 illustrating the top of the image reading device 1. FIGS. 3A and 3B are longitudinal cross sections of the image reading device 1.

The image reading device 1 is a so-called flat head type scanner having the function as a general-purpose scanner. The image reading device 1 includes the main body 3 having a first reading surface 11 and a second reading surface 12 on its top side, and a body cover 5 which is attached to the main body 3 and is openable and closable with respect to the top of the main body 3.

On the front side of the main body 3 (corresponding to the front side of FIGS. 1A and 1B, and the lower side of FIG. 2), an operation unit 15, which includes various types switches to be used by a user for making settings for the image reading device 1 and an LCD panel on which various types of information about the image reading device 1 are displayed, is located. The switches of the operation unit 15 include a start key used for instructing the image reading device 1 to start a reading operation (i.e., an operation in a code reading mode) for reading a code represented in a form of a pictorial pattern (hereafter, referred to as a pictorial code) displayed on a LCD display of a mobile phone, a start key used for instructing the image reading device 1 to start an reading operation (i.e., an operation in an original reading mode) for reading images formed on an original. Whether the image reading device is in the code reading mode or in the original reading mode is checked by judging which of the start keys is pressed.

The main body 3 includes a housing 20 which is formed in a box shape and has an opening on the top thereof, a rectangular platen glass 13 which is attached to the opening of the housing 20, a positioning member 17, a white standard member 19, an image sensor 21, a motor 23 for driving the image sensor 21, a belt mechanism 25 configured to move the image sensor 21 using the driving force produced by the motor 23. The positioning member 17 serves to separate the platen glass 13 into the first reading surface 11 and the second reading surface 12, and is used for the positioning of an original P to be placed on the first reading surface 11.

More specifically, the first reading surface 11 corresponds to a region for reading the original P placed by the user. As shown in FIGS. 3A and 3B, the first reading surface 11 is located on the right side on the top of the image reading unit 1. The second reading surface 12 is a region for reading the original P carried thereto from an automatic document feeder (ADF) 40, and is located on the left side of the image reading unit 1.

The image sensor 21 is provided under the platen glass 3 in the main body 3 so as to be movable in the longitudinal direction of the image reading device 1 (i.e., in a left and right direction in FIGS. 3A and 3B). The image sensor 21 is configured to emit light from LEDs accommodated therein as light sources toward the original P placed on the platen glass 13, to receive light reflected from the original P on a photoreceptor, and to generate an image signal corresponding to the received image of the original. In this embodiment, a light receiving surface of the image sensor 21 (the photoreceptor) has the length substantially equal to the size of the shorter side of the platen glass 13 and has the width sufficiently smaller than the size of the longer side of the platen glass 13. That is, the image sensor 21 is configured as a line sensor for reading the original on a line-by-line basis. The light sources (LEDs) of the image sensor 21 may be kept on constantly.

As shown in FIGS. 3A and 3B, the image sensor 21 is fixed to a belt 25b hung to a pair of rollers 25s and 25s provided in the belt mechanism 25. In this configuration, the image sensor 21 is moved in the longitudinal direction of the image reading device 1 with movement of the belt 25b by the driving force produced by the motor 23.

In order to read the original P carried to the second reading surface 12 by an operation of the automatic document feeder 40 provided in the body cover 5, the image sensor 21 is carried to a position under the second reading surface 12 and is fixed at the position (see FIG. 3A). In order to read the original P placed on the first reading surface 11, the image sensor 21 is moved in the left and right direction in FIGS. 3A and 3B under the image reading surface 12 (see FIG. 3B), i.e., light from the image sensor 21 scans the original P in the left and right direction in FIGS. 3A and 3B. That is, a scanning path, along which the image sensor 21 moves under the first reading surface 11 during the reading operation for reading the original P, has a scanning start point located at the left edge (i.e., a boundary between the first reading surface and the positioning member 17) of the first reading surface 11. The scanning path extends to the right edge of the first reading surface 11.

If the original P is read in the original reading mode, an end point of the scanning path is determined in accordance with a predetermined sheet size set by the user through the operation unit 15. The platen glass 13 has a size corresponding to the maximum readable sheet size of the image reading device 1. In this embodiment, a legal size is defined as the maximum readable sheet size. The A4 size is set as default setting for the reading size. Therefore, although the image sensor 21 is able to move to the right edge of the first reading surface 19, the image sensor 21 only scans in a range of the A4 size unless the user changes the setting of the reading size form the default value to a different value.

Not in the reading mode, the image sensor 21 stays at a predetermined home position. In this embodiment, the predetermined home position of the image sensor 21 is a position immediately under the positioning member 17.

The body cover 5 includes the automatic document feeder 40 operating to carry the original P placed on a paper feed tray 41 to the second reading surface 12 and to eject the original, for which the reading operation has been conducted on the second reading surface 12, toward an ejection tray 42.

The automatic document feeder 40 includes feed rollers 44 and 45 at a start point of a sheet feed path. By rotating the feed rollers 44 and 45 while pressing the feed rollers 44 and 45 against the original P, the original P is carried toward the downstream of the sheet feed path. On the downstream side of the feed rollers 44 and 45, a pair of carrying rollers 47 and 48 are located. The original P carried from the feed rollers 44 and 45 is sandwiched between the carrying rollers 47 and 48, and is carried further to the downstream side with the rotation of the carrying rollers 47 and 48.

On the downstream side of the carrying rollers 47 and 48, an upper plate 49 is located to face the second reading surface 12 and to form clearance having a predetermined size between the second reading surface 12 and the upper plate 49. After carried by the carrying rollers 47 and 48, the original P passes through the clearance between the upper plate 49 and the second reading surface 12, and is fed to a pair of carrying rollers 51 and 52.

The pair of carrying rollers 51 and 52, which are located on the downstream side of the second reading surface 12, sandwich the original P so as to carry the original P to a pair of ejection rollers 53 and 54. After receiving the original P from the carrying rollers 51 and 52, the ejection rollers 53 and 54 sandwich the original P and eject the original P to the ejection tray 42.

Figure 4:
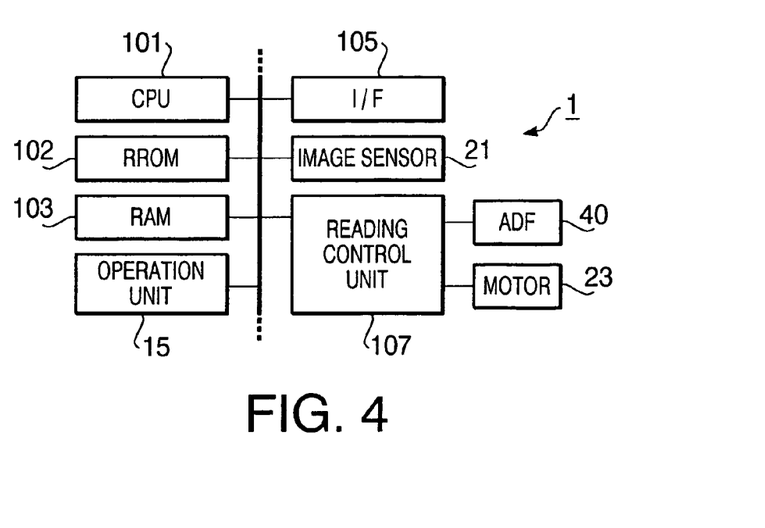
FIG. 4 is a block diagram of the image reading device.

FIG. 4 is a block diagram of the image reading device 1. As shown in FIG. 4, the image reading device 1 includes a CPU 101 for controlling various components in the image reading device 1, a ROM 102 storing various programs to be executed by the CPU 101, and a RAM 103 used as a work memory by the CPU 101. The image reading device 1 further includes a network interface (I/F) 105 for interfacing the image reading device 1 with external devices, and a reading control unit 107 having the functions of correcting image data corresponding to an image signal from the image sensor 21 and controlling the automatic document feeder 40 and motor 23. As shown in FIG. 4, these units are connected to each other to form a control system of the image reading device 1.

Figure 5:
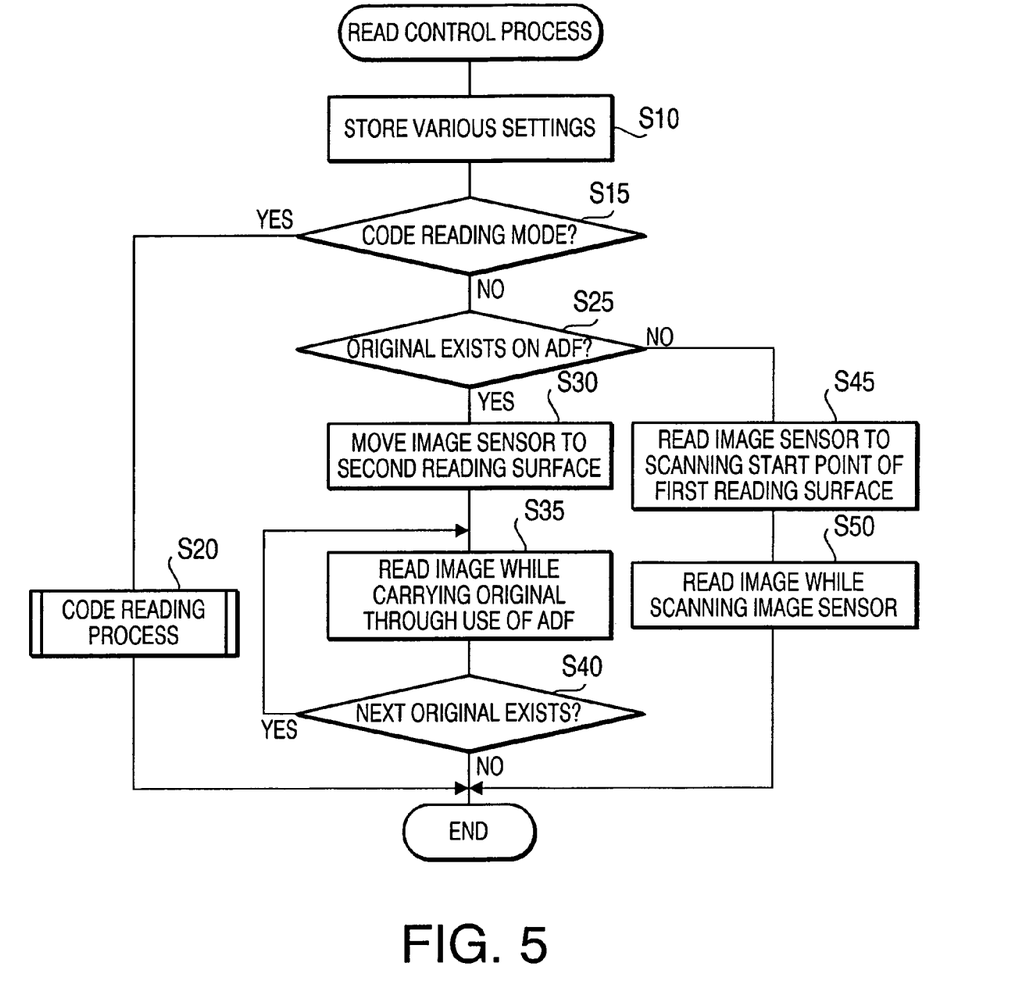
FIG. 5 is a flowchart illustrating a read control process executed under control of a CPU of the image reading device.

Hereafter, operations of the image reading device 1 will be described with reference to FIGS. 5 and 6. FIG. 5 is a flowchart illustrating a read control process executed under control of the CPU 101 of the image reading device 1. The read control process is initiated when one of the start keys for instructing the image reading device 1 to start the reading operation is operated by the user through the operation unit 15.

First, the CPU 101 stores the settings, inputted by the user to the image reading device 1 through the operation unit 15, into the RAM 103 (step S10). Then, the CPU 101 judges whether the reading mode stored in the RAM 103 is the code reading mode (step S15). In this embodiment, the pictorial code is, for example, a barcode, a QR code®, PDF 417®, DataMatrix®, or Maxi Code®.

If the reading mode is the code reading mode (step S15: YES), a code reading process is executed (step S20). Then, the read control process terminates.

If the reading mode is the original reading mode (step S15: NO), the CPU 101 judges whether an original P is placed on the paper feed tray 41 of the automatic document feeder 40 in accordance with an output signal generated by a original detection sensor (not shown) (step S25). If the original P is placed on the paper feed tray 41 (step S25: YES), the CPU 101 controls the motor 23 through the reading control unit 107 and moves the image sensor 21 to the position under the second reading surface 12 (step S30).

Next, the CPU 101 controls the automatic document feeder 40 through the reading control unit 107 so as to carry a sheet of paper (original P) to the position on the second reading surface 12. The CPU 101 also controls the reading control unit 107 so that the image sensor 21 reads an image formed on the original P when the original P passes through the second reading surface (step S35).

The reading control unit 107 converts the image signal carrying information in a digital form into image data. In this case, the reading control unit 107 may conduct shading compensation for the image data. The image data generated as above may be stored temporarily in the RAM 103 and may be transmitted to an external computer via the network interface 105. After step S35 is finished, the CPU 101 judges whether another original P is placed on the paper feed tray 25 (step S40). If another original P is placed on the paper feed tray 41 (step S40: YES), control returns to step S35. If no original P is placed on the paper feed tray 41 (step S40: NO), the reading control process terminates.

If it is judged in step S25 that an original P is not placed on the paper feed tray 41 (step S25: NO), the CPU 101 controls the motor 23 via the reading control unit 107 so as to move the image sensor 21 to the scanning start point (step S45). Then, the CPU 101 controls the motor 23 via the reading control unit 107 to move the image sensor 21 to the end point (right edge) of the rage defined by the reading size of an original, which has been set by the user in advance and is stored in the RAM 103, while controlling the image sensor 21 to read the original P placed on the first reading surface 11 (step S50). After step S50 is finished, the reading control process terminates.

Figure 6:
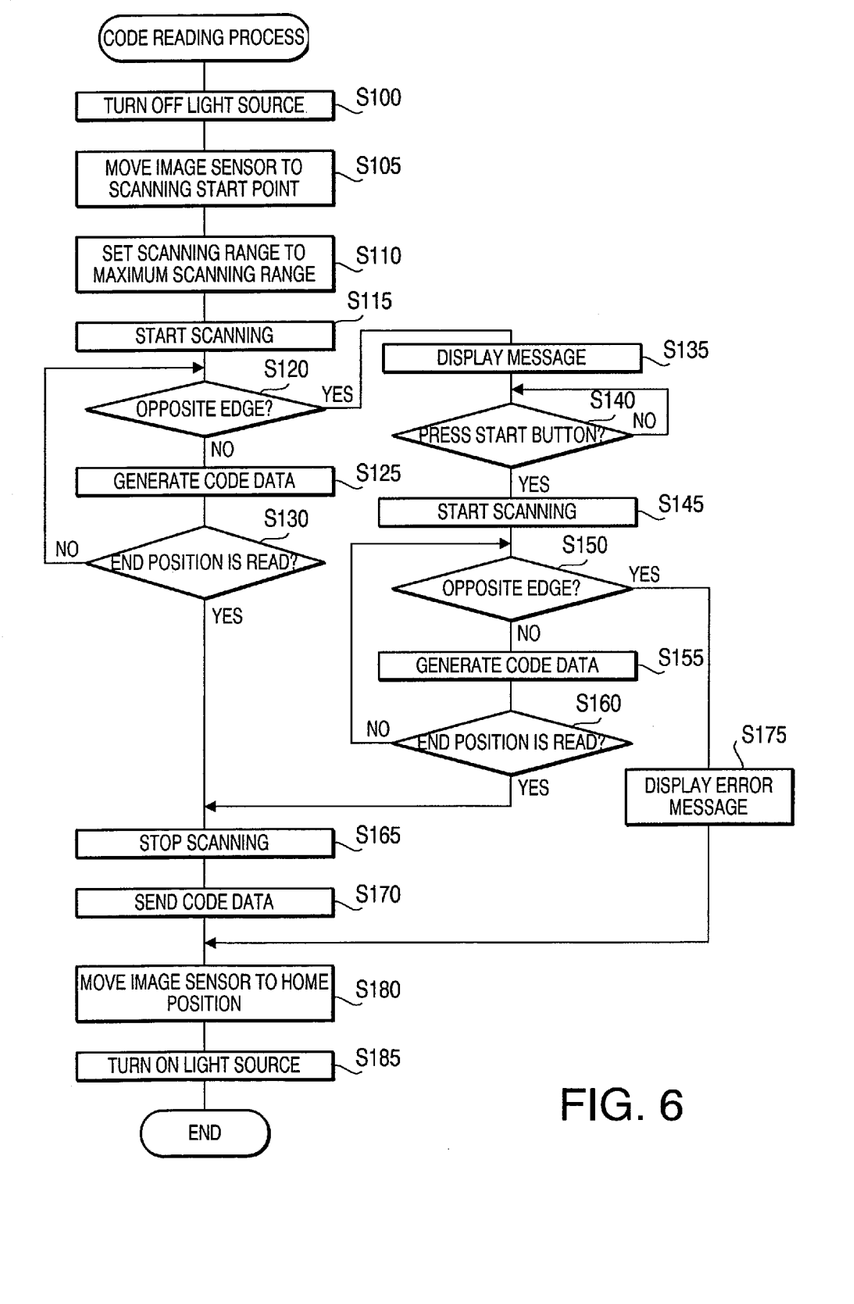
FIG. 6 is a flowchart illustrating a code reading process executed under control of the CPU of the image reading device.

FIG. 6 is a flowchart illustrating the code reading process executed under control of the CPU 101 of the image reading device 1 in step S20 of the reading control process. First, the CPU 101 controls the reading control unit 107 to turn off the light source (LEDs) of the image sensor 21 (step S100). Then, the CPU 101 controls the motor 23 to move the image sensor 21 to the scanning start point (step S105). Next, the CPU 101 changes the setting of the reading size of an original stored in the RAM 103 to the maximum size (i.e., the CPU 101 uses the maximum scanning range) (step S110). Then, the CPU 101 starts to scan (step S115).

Next, in step S120, the CPU 101 judges whether the image sensor 21 reaches the opposite edge of the maximum scanning range (step S120). If the image sensor 21 does not reach the opposite edge (step S120: NO), the CPU 101 generates code data (obtained by digitizing a pictorial code) based on an image signal (step S125).

Using the code data, the CPU 101 judges whether the image sensor 21 finishes reading the end position of the pictorial code (step S130). More specifically, the CPU 101 judges whether the image sensor 21 reads the end position of the pictorial code by judging whether the generated code data coincides with code data of a particular pattern representing the termination of a pictorial code.

If the end position of the pictorial code is not read yet (step S130: NO), control returns to step S120. If the end position of the pictorial code is read (step S130: YES), control proceeds to step S165.

If it is judged in step S120 that the image sensor 21 reaches the opposite edge of the scanning range before the image sensor 21 detect the termination of the pictorial code (step S120: YES), the CPU 101 displays a message requesting for re-reading on the LCD panel of the operation unit 15 (step S135). Then, the CPU 101 waits until the start key is pressed (step S140). If the start key is pressed (step S140: YES), the CPU 101 starts the scan in an inverse direction for moving from the opposite edge to the scanning start point (step S145). Then, the CPU 101 judges whether the image sensor 21 reaches the scanning start point (step S150).

If the image sensor 21 has not reached the scanning start point (step S150: NO), the CPU 101 generates the code data based on the image signal (step S155). Then, the CPU 101 judges whether the image sensor 21 finishes reading an end position of the pictorial code (step S160). It should be noted that the end position to be detected in step S160 corresponds to a start position of the pictorial code found when the image sensor 21 moves from the scanning start point to the opposite edge.

If the end position of the pictorial code has not been read yet (step S160: NO), control returns to step S150. If the end position of the pictorial code has been read (step S160: YES), control proceeds to step S165 where the CPU 101 stops the scanning of the image sensor 21. Then, the CPU 101 transmits the generated code data to an external computer via the network interface 105 (step S170). Then, control proceeds to step S180.

If the image sensor 21 reaches the scanning start point before the image sensor 21 detect the end position of the pictorial code (step S150: YES), the CPU 101 displays a error message on the LCD panel of the operation unit 15 (step S175). Then, the CPU 101 moves the image sensor 21 to the home position (step S180), and turns off the light source of the image sensor 21 (step S185). Then, the code reading process terminates.

As described above, when the image reading device 1 changes to the code reading mode, the light source is turned off. Therefore, it is possible to read the pictorial code displayed on the LCD screen of the mobile phone without causing the LCD screen of the mobile phone to reflect light from the light source of the image reading device 1. Therefore, it is possible to reliably read the pictorial code displayed on the LCD screen.

In the code reading mode, the image reading device 1 stops to scan an original when the image sensor 21 reads an end position of a pictorial code. Therefore, it is possible to prevent the image sensor 21 to wastefully continue to scan the original despite the fact that the reading of the pictorial code has finished.

In the code reading mode, the scanning range is set for the maximum scanning range (i.e., a range including the scanning start point and the opposite edge of the first reading surface). Therefore, even if a mobile phone is placed in the vicinity of the opposite edge of the first reading surface 11, it is possible to read a pictorial code displayed on an LCD panel of the mobile phone without requesting a user to conduct a setting operation for the scanning range.

In the code reading process, if the image sensor 12 reaches the opposite edge of the first reading surface 11 without finishing the reading of the pictorial code, the image sensor 21 is moved back to the scanning start point from the opposite edge. Therefore, even if the LCD screen of the mobile phone is placed in the vicinity of the opposite edge of the first reading surface 11 and a backlight of the LCD screen of the mobile phone is turned off before the image sensor 21 finishes reading the pictorial code, the reading of the LCD screen of the mobile phone can be attained by only requesting the user to turn on the backlight of the LCD screen of the mobile phone and to place the LCD screen of the mobile phone at the opposite edge.

It should be noted that the user is able to change the mode of the image reading device 1 to the code reading mode by only operating the switch on the operation unit 15.

Although the present invention has been described in considerable detail with reference to certain preferred embodiments thereof, other embodiments are possible.

In the above mentioned embodiment, the settings are inputted to the image reading device 1 (i.e., the image reading device 1 is controlled) by the user through the operation unit 15. However, the settings may be inputted to the image reading device 1 from an external computer trough the network interface 105.

In the above mentioned embodiment, the light source of the image sensor 21 is kept on constantly. However, the light source of the image sensor 21 may be controlled so that the light source is turned on only when the reading operation is performed. Such a configuration is attained by adding a step of turning on the light source if the operation mode of the image reading device 1 is the original reading mode (step S15: NO), by adding a step for turning off the light source if the reading of the original is finished (step S40: NO), and by deleting steps S100 and S185 of the code reading process.

It is understood the above mentioned embodiment (i.e., the code reading process for reading a pictorial code) may be applied to various types of devices having various types of displays.

In the above mentioned embodiment, the scanning range (scanning path) of the image sensor 21 has the start point located at the left edge of the first reading surface 101 and the end point located at the right edge (the opposite edge) of the first reading surface 11. However, one of points other than the edge of the first reading surface 11 may set as the scanning start point.

Although in the above mentioned embodiment the reading process according to the embodiment is implemented in the image reading device configured as an image scanner, the present invention may be applied to various types of devices such as a copying device, a facsimile device or a multifunction device having the printing and scanner functions.

What is claimed is:

1. An image reading device, comprising:
    a reading unit that reads an object in a predetermined size based on light from the object;
    a scanning unit that moves the reading unit to scan the object along a scanning path; and
    a scan start unit configured to control the scanning unit to start scanning in response to receipt of a command for changing to a code reading mode in which a code formed by a pictoral pattern displayed on a screen of a device is read as the object;
    an analysis unit configured to analyze the code read by the reading unit;
    a repetition unit configured to control the scanning unit and the analysis unit to repetitively execute reading and analysis until the reading unit reads information representing termination of the code; and
    a scan prohibition unit configured to prohibit the scanning unit from moving the reading unit so as to stop scanning of the object in response to the analysis unit detecting that the reading unit has read information representing termination of the code,
    an inverse scanning unit configured such that if the reading unit does not finish reading of the code before the reading unit reaches an end position of a scanning range, the inverse scanning unit moves the reading unit in a direction opposite to a direction in which the reading unit is moved by the scanning unit, from the end position of the scanning range, wherein the inverse scanning unit moves the reading unit if the inverse scanning unit receives a command requesting for re-reading.

2. The image reading device according to claim 1, further comprising an input unit configured to input the command for changing to the code reading mode.

3. The image reading device according to claim 1, wherein the screen of the device includes a LCD screen of a mobile phone.

4. An image reading device, comprising:
    a mount surface on which an object is placed, the mount surface being optically transparent;
    a reading unit that is located under the mount surface to read the object in a predetermined size based on light incident thereon from the object through the mount surface;
    a scanning unit that moves the reading unit to scan the object along a scanning path;
    a scan range setting unit configured to set a range of the scanning path to a scanning range inputted externally; and
    a scan edge determination unit configured such that if the scan edge determination unit receives a command for changing to a code reading mode in which a code formed by a pictorial pattern displayed on a screen of a device is read as the object, the scan edge determination unit inputs a range including an edge of the mount surface to the scan range setting unit as the scanning range.

5. The image reading device according to claim 4, further comprising an inverse scanning unit configured such that if the reading unit does not finish reading of the code before the reading unit reaches an end position of the scanning range, the inverse scanning unit moves the reading unit in a direction opposite to a direction in which the reading unit is moved by the scanning unit, from the end position of the scanning range.

6. The image reading device according to claim 5, wherein the inverse scanning unit moves the reading unit if the inverse scanning unit receives a command requesting for re-reading.

7. The image reading device according to claim 4, further comprising an input unit configured to input the command for changing to the code reading mode.

8. The image reading device according to claim 4, wherein the screen of the device includes a LCD screen of a mobile phone.

* * * * *